US011317391B2

(12) United States Patent
Hong et al.

(10) Patent No.: US 11,317,391 B2
(45) Date of Patent: Apr. 26, 2022

(54) METHOD FOR TRANSMITTING/RECEIVING SPECIAL SUBFRAME IN WIRELESS COMMUNICATION SYSTEM AND DEVICE THEREFOR

(71) Applicant: LG ELECTRONICS INC., Seoul (KR)

(72) Inventors: Uihyun Hong, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 264 days.

(21) Appl. No.: 16/483,403

(22) PCT Filed: Feb. 5, 2018

(86) PCT No.: PCT/KR2018/001519
§ 371 (c)(1),
(2) Date: Aug. 2, 2019

(87) PCT Pub. No.: WO2018/143752
PCT Pub. Date: Aug. 9, 2018

(65) Prior Publication Data
US 2021/0266874 A1    Aug. 26, 2021

Related U.S. Application Data

(60) Provisional application No. 62/454,866, filed on Feb. 5, 2017.

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0007* (2013.01); *H04L 5/0048* (2013.01);
(Continued)

(58) Field of Classification Search
CPC ........... H04W 72/042; H04W 72/0446; H04W 72/0413; H04L 5/1469; H04L 27/2613;
(Continued)

(56) References Cited

U.S. PATENT DOCUMENTS

2017/0111923 A1\* 4/2017 Nogami ............ H04W 72/1263
2017/0223702 A1\* 8/2017 Yin ........................ H04L 1/1887
(Continued)

FOREIGN PATENT DOCUMENTS

WO    2016199989    12/2016

OTHER PUBLICATIONS

PCT International Application No. PCT/KR2018/001519, Written Opinion of the International Searching Authority dated May 28, 2018, 28 pages.
(Continued)

*Primary Examiner* — Sharmin Chowdhury
(74) *Attorney, Agent, or Firm* — Lee, Hong, Degerman, Kang & Waimey

(57) ABSTRACT

A method in which a terminal transmits/receives a special subframe in a wireless communication system supporting time division duplex (TDD) according to an embodiment of the present invention includes: a step for receiving information about a special subframe configuration; a step for receiving a downlink signal from a base station during a time corresponding to a downlink pilot time slot (DwPTS) allocated according to the special subframe configuration; and a step for transmitting an uplink signal to the base station during a time corresponding to an uplink pilot time slot (UpPTS) allocated according to the special subframe configuration, wherein the special subframe consists of the DwPTS, a guard period (GP), and the UpPTS, and is received or transmitted through an sTTI structure pattern including a plurality of short transmission time interval
(Continued)

(sTTI) transmission blocks, wherein the sTTI structure patterns can be determined according to the special subframe configuration.

8 Claims, 12 Drawing Sheets

(51) Int. Cl.
  *H04L 5/14* (2006.01)
  *H04L 27/26* (2006.01)
(52) U.S. Cl.
  CPC ........ *H04L 5/1469* (2013.01); *H04L 27/2607* (2013.01); *H04L 27/2613* (2013.01); *H04W 72/0413* (2013.01); *H04W 72/0446* (2013.01)
(58) Field of Classification Search
  CPC .. H04L 5/0007; H04L 27/2607; H04L 5/0048
  See application file for complete search history.

(56) References Cited

U.S. PATENT DOCUMENTS

2018/0283896 A1\* 10/2018 Piemonte ........... G01C 21/3664
2019/0379515 A1\* 12/2019 Gao .................... H04W 72/042

OTHER PUBLICATIONS

Sharp, "Processing time reduction for TDD with 1-slot sTTI", 3GPP TSG RAN WG1 Meeting #87, R1-1612619, Nov. 2016, 3 pages.
NTT Docomo, "Views on sTTI operation", 3GPP TSG RAN WG1 Meeting #87, R1-1612693, Nov. 2016, 7 pages.
LG Electronics, "Discussion on sPUSCH and DM-RS designs for sTTI", 3GPP TSG RAN WG1 Meeting #87, R1-1611778, Nov. 2016, 5 pages.
Catt, "Design for sTTI partition", 3GPP TSG RAN WG1 Meeting #87, R1-1611349, Nov. 2016, 5 pages.

\* cited by examiner (a) Control-plane protocol stack (b) User-plane protocol stack

METHOD FOR TRANSMITTING/RECEIVING SPECIAL SUBFRAME IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/001519, filed on Feb. 5, 2018, which claims the benefit of U.S. Provisional Application No. 62/454,866, filed on Feb. 5, 2017, the contents of which are all hereby incorporated by reference herein in their entireties.

TECHNICAL FIELD

The present invention relates to a wireless communication system, and more particularly, to a method for transmitting and receiving a special subframe of a type 2 radio frame used in a time division duplex (TDD) system and a device therefor.

BACKGROUND ART

As an example of a wireless communication system to which the present disclosure is applicable, a 3rd generation partnership project long term evolution (3GPP LTE) (hereinafter, referred to as 'LTE') communication system will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several UEs. Different cells may be set to provide different bandwidths. Also, one base station controls data transmission and reception for a plurality of UEs. The base station transmits downlink (DL) scheduling information of downlink data to the corresponding UE to notify the corresponding UE of time and frequency domains to which data will be transmitted and information related to encoding, data size, and hybrid automatic repeat and request (HARQ). Also, the base station transmits uplink (UL) scheduling information of uplink data to the corresponding UE to notify the corresponding UE of time and frequency domains that can be used by the corresponding UE, and information related to encoding, data size, and HARQ. An interface for transmitting user traffic or control traffic may be used between the base stations. A Core Network (CN) may include the AG and a network node or the like for user registration of the UE. The AG manages mobility of the UE on a Tracking Area (TA) basis, wherein one TA includes a plurality of cells.

In general, a wireless communication system is a multiple access system that supports communication with multiple users by sharing available radio resources (time, frequency, bandwidth, code, transmission power, etc.). For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In the 3GPP LTE system, the time taken for control information or user data to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane.

Latency is one of main factors for real-time user experience, and low latency is determined as a very important performance index even for a service that requires high reliability. Meanwhile, a TTI having a length of 1 ms has a structure not suitable for low latency requirements in a next-generation wireless communication system.

Therefore, there is a need for a method for deploying a radio resource structure for satisfying lower latency by controlling a short TTI subdivided from the existing TTI.

DISCLOSURE

Technical Problem

An object of the present invention is to provide a method for configuring and transmitting a special subframe of a type 2 radio frame having a short transmission time interval (sTTI) structure in a wireless LAN system for supporting a TDD system.

Another object of the present invention is to provide a wireless communication system of a TDD system having low latency using a special subframe having an sTTI structure.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In accordance with one embodiment of the present specification, a method for transmitting/receiving a special subframe from/in a user equipment (UE) in a wireless communication system supporting time division duplex (TDD) comprises the steps of receiving information on a special subframe configuration, receiving a downlink signal from a base station during a time corresponding to a downlink pilot time slot (DwPTS) allocated in accordance with the special subframe configuration, and transmitting an uplink signal to the base station during a time corresponding to an uplink pilot time slot (UpPTS) allocated in accordance with the special subframe configuration, wherein the special subframe may include the DwPTS, a guard period (GP), and the UpPTS, and may be received or transmitted through a short transmission time interval (sTTI) structure pattern including a plurality of sTTI transport blocks, wherein the sTTI structure pattern may be determined in accordance with the special subframe configuration.

In accordance with another embodiment of the present specification, a method for transmitting/receiving a special subframe from/in a base station in a wireless communication system supporting time division duplex (TDD) comprises the steps of transmitting information on a special subframe configuration, transmitting a downlink signal to a user equipment (UE) during a time corresponding to a downlink pilot time slot (DwPTS) allocated in accordance with the special subframe configuration, and receiving an uplink signal from the UE during a time corresponding to an uplink pilot time slot (UpPTS) allocated in accordance with the special subframe configuration, wherein the special subframe may include the DwPTS, a guard period (GP), and the UpPTS, and may be transmitted or received through a short transmission time interval (sTTI) structure pattern including a plurality of sTTI transport blocks, wherein the sTTI structure pattern may be determined in accordance with the special subframe configuration.

In accordance with still another embodiment of the present specification, a UE for transmitting/receiving a special subframe in a wireless communication system supporting time division duplex (TDD) comprises a radio frequency (RF) unit, and a processor, wherein the processor may be configured to receive information on a special subframe configuration, receive a downlink signal from a base station during a time corresponding to a downlink pilot time slot (DwPTS) allocated in accordance with the special subframe configuration, and transmit an uplink signal to the base station during a time corresponding to an uplink pilot time slot (UpPTS) allocated in accordance with the special subframe configuration, wherein the special subframe may include the DwPTS, a guard period (GP), and the UpPTS, and may be received or transmitted through a short transmission time interval (sTTI) structure pattern including a plurality of sTTI transport blocks, wherein the sTTI structure pattern may be determined in accordance with the special subframe configuration.

In accordance with further still another embodiment of the present specification, a base station for transmitting/receiving a special subframe in a wireless communication system supporting time division duplex (TDD) comprises a radio frequency (RF) unit, and a processor, wherein the processor may be configured to transmit information on a special subframe configuration, transmit a downlink signal to a user equipment (UE) during a time corresponding to a downlink pilot time slot (DwPTS) allocated in accordance with the special subframe configuration, and receive an uplink signal from the UE during a time corresponding to an uplink pilot time slot (UpPTS) allocated in accordance with the special subframe configuration, wherein the special subframe may include the DwPTS, a guard period (GP), and the UpPTS, and may be transmitted or received through a short transmission time interval (sTTI) structure pattern including a plurality of sTTI transport blocks, wherein the sTTI structure pattern may be determined in accordance with the special subframe configuration.

The followings may commonly be applied to the method and device for transmitting/receiving a special subframe through a UE or base station in a wireless communication system supporting TDD.

Each of the plurality of sTTI transport blocks may be set to a length of 2 or 3 orthogonal frequency division multiplexing (OFDM) symbols.

The sTTI structure pattern may not include sTTI transport block mapped into a boundary of the DwPTS and the GP.

The method may further comprise the step of receiving information related to the number of OFDM symbols used for transmission of a PDCCH (Physical Downlink Control Channel), wherein the sTTI structure pattern may be determined in accordance with the number of OFDM symbols used for transmission of the PDCCH.

The sTTI pattern may be determined as one of (3,2,2,2,2,3), (3,2,2,3,2,2), (3,2,2,2,3,2), and (3,3,2,2,2,2) when the number of OFDM symbols used for transmission of the PDCCH is 1 or 3.

The sTTI pattern may be determined as one of (2,3,2,2,2,3), (2,3,2,3,2,2), (2,3,2,2,3,2), and (2,2,2,2,2,2) when the number of OFDM symbols used for transmission of the PDCCH is 2.

The UE may not perform transmission and reception of the special subframe through the sTTI structure pattern when the number of OFDM symbols used for transmission of the PDCCH is 1 or 3 and the special subframe configuration is determined as #6 or #9.

The UE may not perform transmission and reception of the special subframe through the sTTI structure pattern when the number of OFDM symbols used for transmission of the PDCCH is 2 and the special subframe configuration is determined as #0, #5, #6 or #9.

Advantageous Effects

According to one embodiment of the present invention, latency in a wireless LAN system for supporting a TDD system may be reduced.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

Figure 10:
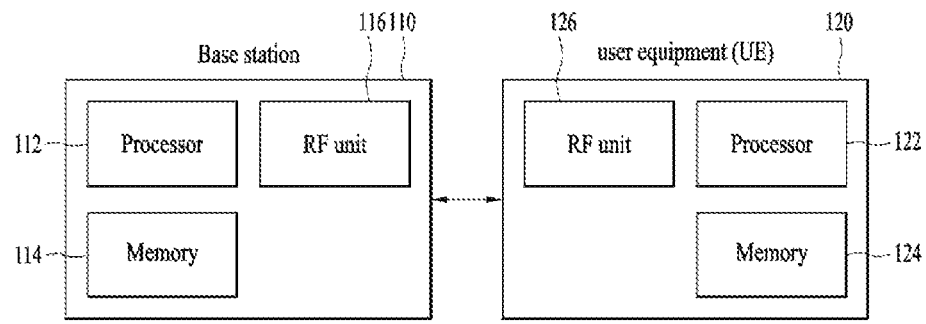

FIG. 10 illustrates a Base Station (BS) and a User Equipment (UE) applicable to an embodiment of the present disclosure.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present disclosure are not limited to the 3GPP LTE/LTE-A. Also, specific terminologies hereinafter used in the embodiments of the present disclosure are provided to assist understanding of the present disclosure, and various modifications may be made in the specific terminologies within the range that they do not depart from technical spirits of the present disclosure.

Figure 1:
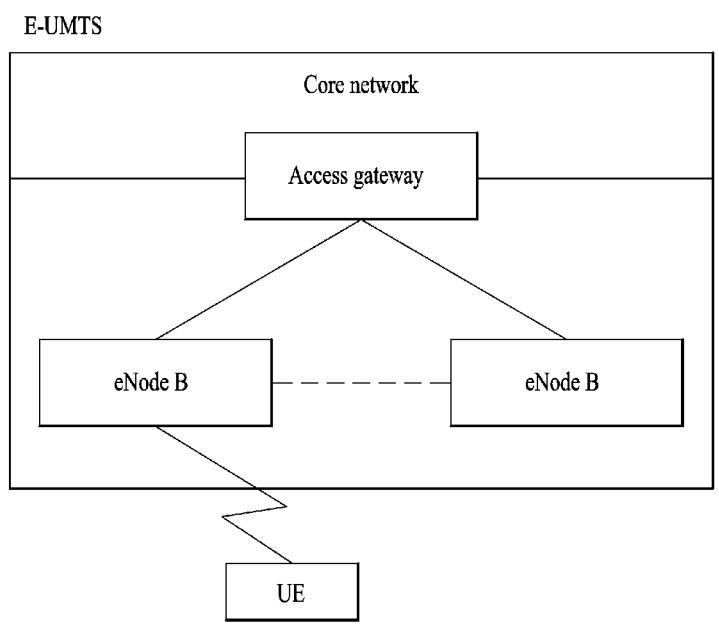
FIG. 1 schematically illustrates an E-UMTS network structure as an example of a wireless communication system.
Figure 2:
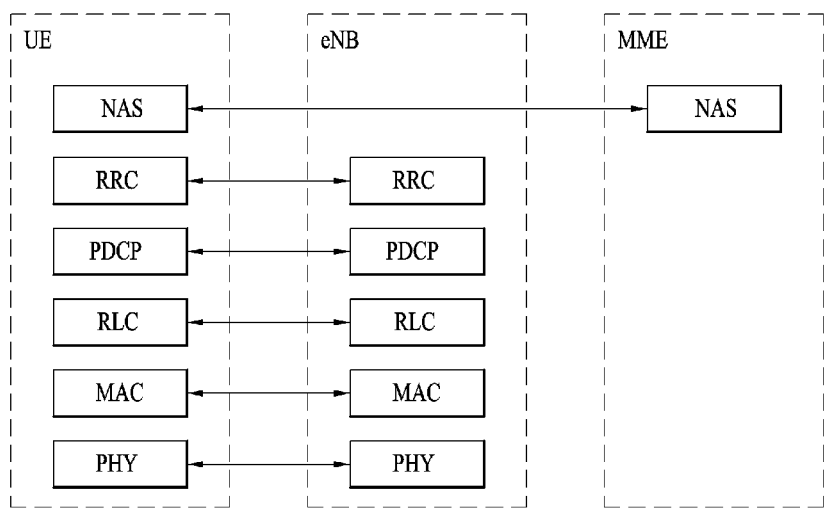
FIG. 2 illustrates control plane and user plane structures of a radio interface protocol between a UE and an E-UTRAN on the basis of the 3GPP wireless access network standard.
Figure 2:
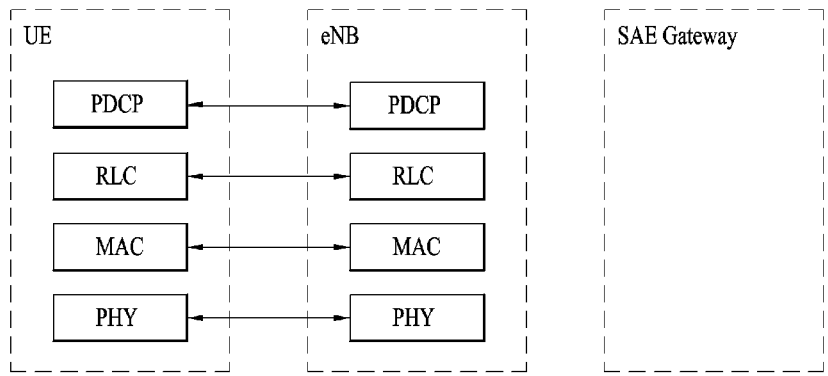

FIG. 2 is a diagram illustrating structures of a control plane and a user plane of a radio interface protocol between a UE and E-UTRAN based on the 3GPP radio access network standard. The control plane means a passageway where control messages are transmitted, wherein the control messages are used by the UE and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in downlink and is modulated in accordance with a single carrier frequency division multiple access (SC-FDMA) scheme in uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RB s') to be in charge of controlling the logical, transport and physical channels. In this case, the RB means a service provided by the second layer for the data transfer between the UE and the network. To this end, the RRC layers of the UE and the network exchange RRC message with each other. If the RRC layer of the UE is RRC connected with the RRC layer of the network, the UE is in an RRC connected mode. If not so, the UE is in an RRC idle mode. A non-access stratum (NAS) layer located above the RRC layer performs functions such as session management and mobility management.

One cell constituting a base station (eNB) is set to one of bandwidths of 1.4, 3.5, 5, 10, 15, and 20 MHz and provides a downlink or uplink transmission service to several UEs. At this time, different cells may be set to provide different bandwidths.

As downlink transport channels carrying data from the network to the UE, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the UE to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
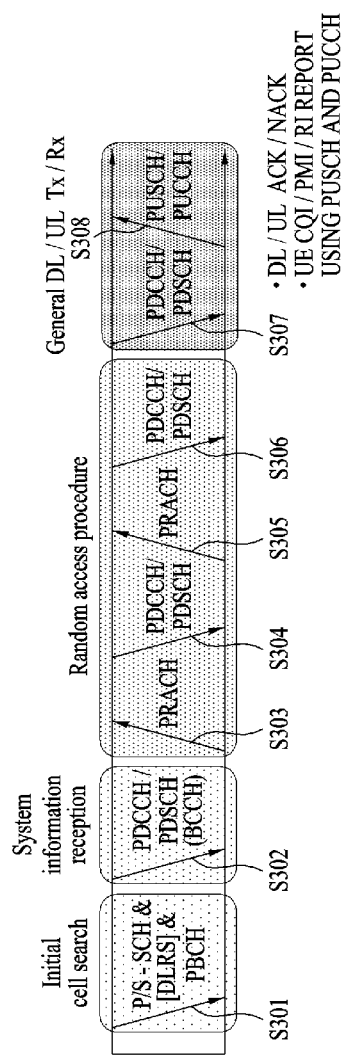
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The UE performs initial cell search such as synchronizing with the base station when it newly enters a cell or the power is turned on at step 5301. To this end, the UE synchronizes with the base station by receiving a primary synchronization channel (P-SCH) and a secondary synchronization channel (S-SCH) from the base station, and acquires information such as cell ID, etc. Afterwards, the UE may acquire broadcast information within the cell by receiving a physical broadcast channel (PBCH) from the base station. Meanwhile, the UE may identify a downlink channel status by receiving a downlink reference signal (DL RS) at the initial cell search step.

The UE which has finished the initial cell search may acquire more detailed system information by receiving a physical downlink shared channel (PDSCH) in accordance with a physical downlink control channel (PDCCH) and information carried in the PDCCH at step S302.

Afterwards, the UE may perform a random access procedure (RACH) such as steps S303 to S306 to complete access to the base station. To this end, the UE may transmit a preamble through a physical random access channel (PRACH) (S303) and receive a response message to the preamble through the PDCCH and the PDSCH corresponding to the PDCCH (S304). In case of a contention based RACH, the UE may perform a contention resolution procedure such as transmission (S305) of additional physical random access channel and reception (S306) of the physical downlink control channel and the physical downlink shared channel corresponding to the physical downlink control channel.

The UE which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the UE to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the UE may non-periodically transmit the UCI through the PUSCH in accordance with request/command of the network.

Figure 4:
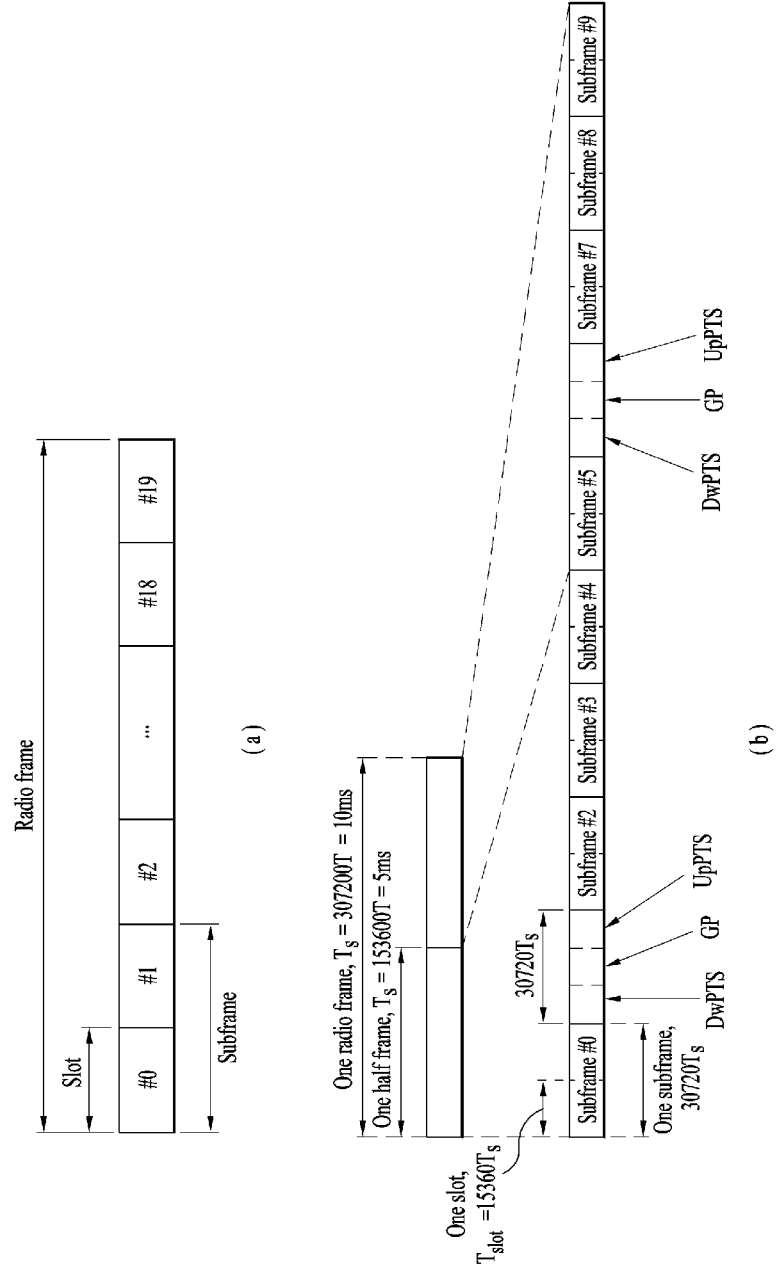
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the UE moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the UE. The UpPTS is used for channel estimation at the base station and uplink transmission synchronization of the UE. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic perfix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

In the type 2 radio frame structure, a total of seven uplink-downlink (UL-DL) configurations exist depending on that a subframe is set to an uplink or a downlink. In case of the configurations #0, #1, #2, and #6, since two GPs exist in one radio frame, switching from the downlink to the uplink occurs twice. In case of the configurations #3, #4, and #5, since one GP exists in one radio frame, switching from the downlink to the uplink occurs once.

Also, a total of 10 configurations may exist in a special subframe including a GP as illustrated in the above Table 1. In a DwPTS of the special subframe, a primary synchronization signal (PSS), a reference signal (RS), a control signal, etc. may be transmitted. On the other hand, in an UpPTS (Uplink Pilot Time Slot) of the special subframe, a random access channel (RACH), a sounding reference signal (SRS), etc. may be transmitted.

If the SRS is configured at a higher end, allocation of additional symbols to the UpPTS may be required. In this way, if allocation of additional symbols to the UpPTS is required by the higher end, the above X may be signaled as a value of 2 or 4, and the time allocated to the UpPTS may be varied depending on the signaled value.

The aforementioned structure of the radio frame is only exemplary, and the number of subframes included in the radio frame, the number of slots included in the subframe, or the number of symbols included in the slot may be changed in various ways.

Figure 5:
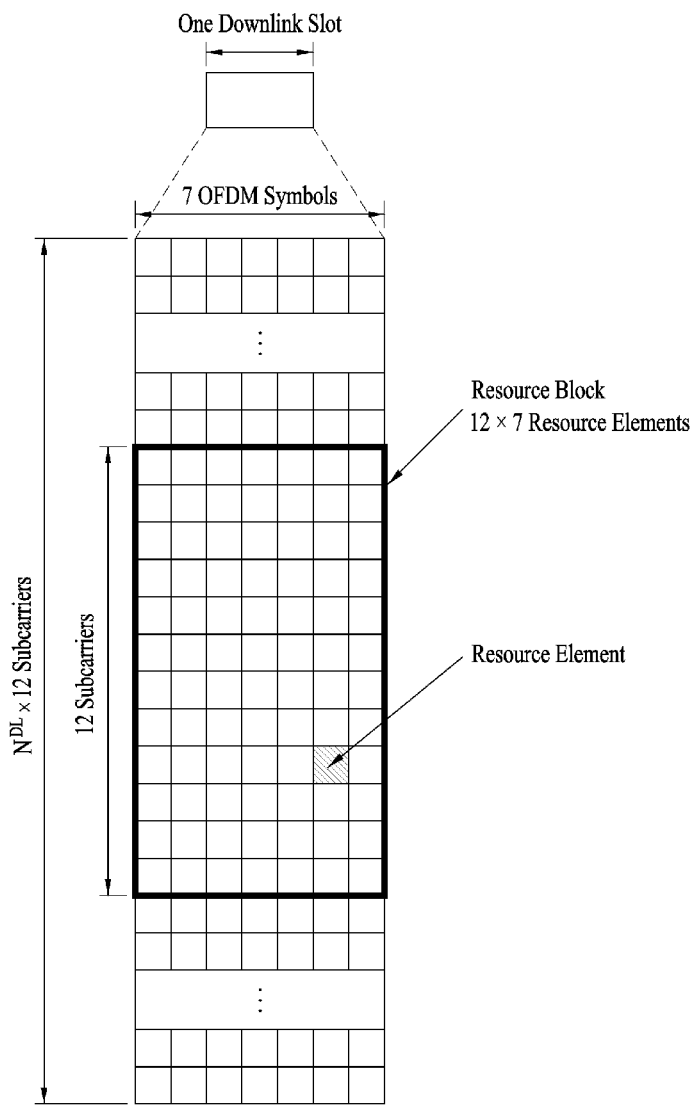
FIG. 5 illustrates a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{sc}^{RB}$ subcarriers, the DL slot includes $N_{RB}^{DL} \times N_{sc}^{RB}$ subcarriers in the frequency domain. Although FIG. 5 shows an example in which the DL slot includes 7 OFDM symbols and the resource block includes 12 subcarriers, the present disclosure is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{sc}^{RB}$ resource elements. The number ($N_{RB}^{DL}$) of resource blocks included in the DL slot depends on a DL transmission bandwidth configured in a cell.

Figure 6:
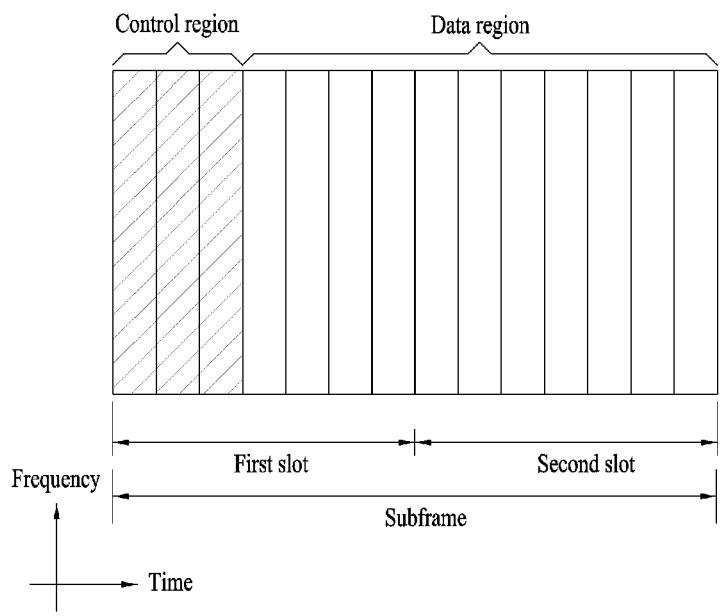
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a UE or a UE group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual UEs in a UE group, a Tx power control command, activation indication information of a VoIP (voice over IP) and the like. A plurality of PDCCHs may be transmitted in a control region. A UE can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a UE and attaches CRC (cyclic redundancy check) to control information. The CRC is masked with an identifier (e.g., RNTI (radio network temporary identifier)) in accordance with an owner or a purpose of use. For instance, if a PDCCH is provided for a specific UE, CRC may be masked with an identifier (e.g., C-RNTI (cell-RNTI)) of the corresponding UE. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
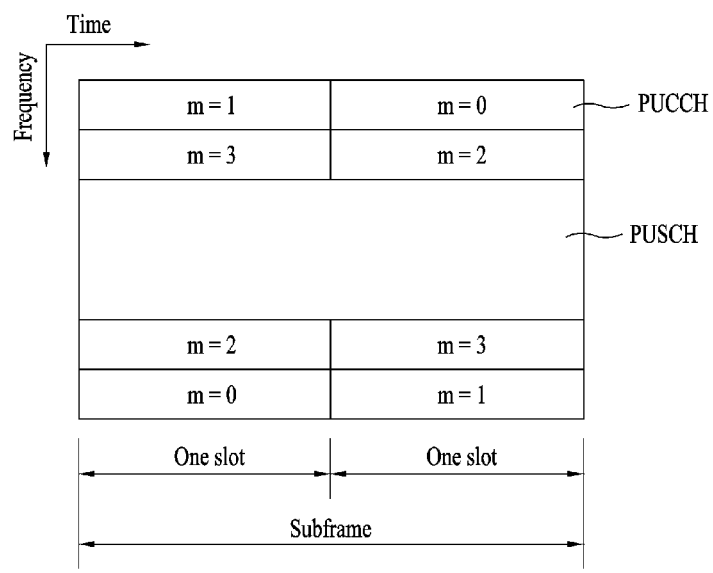
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a UE can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, a method for configuring and transmitting a special subframe in accordance with some embodiments of the present invention will be described based on the aforementioned description.

In a next-generation wireless communication system, a status that TTI is set in various ways for a specific channel of various application fields may be considered in accordance with services for users or requirements of the users. Particularly, in case of a service that requires reliability, TTI used for transmission of a physical channel to reduce latency may be set to be smaller than the existing TTI of 1 msec.

Hereinafter, a case that TTI is set to be smaller than 1 mec which is a general subframe size of the LTE system will be referred to as sTTI. However, the present invention is not limited to such a term and numeral values suggested below, and time units shorter than the TTI, which is used conventionally, may be expressed as sTTI.

Unlike the sTTI structure used for the FDD system, the sTTI structure of the TDD system has an advantage in that resource control of the uplink and the downlink is possible in accordance with the amount of uplink and downlink traffic having low latency. Also, when a TDD frame configuration is changed per subframe, the GP of the special subframe may be used.

Hereinafter, an sTTI structure suitable for configuration of a special subframe of the radio frame structure type 2 for which the TDD system is used will be suggested.

sTTI(Small Transmission Time Interval) Structure Suitable for Low Latency Requirement The sTTI structure that may be used in some embodiments of the present invention will be described.

Figure 8:
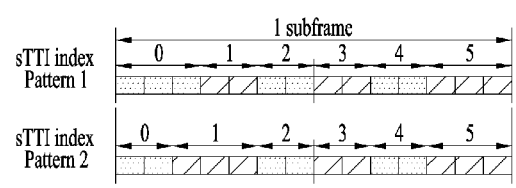
FIG. 8 illustrates an sTTI structure of a 2-symbol structure that may be used in an LTE system.

FIG. 8 illustrates an sTTI structure of a 2-symbol structure that may be used in an LTE FDD system.

According to the LTE standard, a slot constituting a subframe includes seven(7) symbols, and one subframe includes fourteen(14) symbols. A general TTI of the LTE system is 1 msec, but a TTI smaller than 1 msec may be configured to fulfill low latency requirement. As an example of sTTI applicable to the LTE system, a 2-symbol sTTI structure is shown in FIG. 8. A pattern 1 shown in FIG. 8 may be used when the number of symbols used for PDCCH is 1 or 3, and a pattern 2 may be used when the number of symbols used for PDCCH is 2. The number of symbols used for PDCCH may be signaled through a CFI (control format indicator) transmitted through PCFICH.

According to the 2-symbol sTTI disclosed in FIG. 8, a downlink sTTI structure pattern may include {3, 2, 2, 2, 2, 3} or {2, 3, 2, 2, 2, 3} symbols, that is, six sTTIs in accordance with the number of symbols included in the PDCCH. This layout format is intended so as not to configure a specific sTTI at a boundary of the PDCCH in accordance with the number of symbols included in the PDCCH.

Method for Configuring sTTI Structure used for Special Subframe

The following Tables 3 and 4 show lengths of DwPTS, GP, and UpPTS of a special subframe and the number of symbols according to subframe configuration and a value of X signaled from a higher end.

In the following description for each drawing and related Tables, description such as XXX (a1, . . . , an) may mean that sTTI from a1 to an is used to transmit elements, and numbers in parenthesis may mean symbol sizes configuring each sTTI transport block. For example, description such as X=0: DwPTS(3,2,2,2,2), GP(3) means that five sTTI transport blocks, which respectively include 3 symbols, 2 symbols, 2 symbols, 2 symbols and 2 symbols, are transmitted for transmission of the DwPTS and one sTTI of three symbols is transmitted to transmit the GP and the UpPTS.

TABLE 3

| Special Sub-frame | DwPTS (Ts, symbol) | | GP (Ts, symbol) | | UpPTS (symbol, Ts) | | X = 0 |
|---|---|---|---|---|---|---|---|
| 0 | 6592 | 3 | 21936 | 10 | 1 | 2192 | (X + 1) |
| 1 | 19760 | 9 | 8768 | 4 | 1 | 2192 | |
| 2 | 21952 | 10 | 6576 | 3 | 1 | 2192 | |
| 3 | 24144 | 11 | 4384 | 2 | 1 | 2192 | |
| 4 | 26336 | 12 | 2192 | 1 | 1 | 2192 | |
| 5 | 6592 | 3 | 19744 | 9 | 2 | 4384 | (X + 2) |
| 6 | 19760 | 9 | 6576 | 3 | 2 | 4384 | |
| 7 | 21952 | 10 | 4384 | 2 | 2 | 4384 | |
| 8 | 24144 | 11 | 2192 | 1 | 2 | 4384 | |
| 9 | 13168 | 6 | 13168 | 6 | 2 | 4384 | |

TABLE 4

| Special Sub-frame | DwPTS (Ts, symbol) | | GP (Ts, symbol) | | UpPTS (symbol, Ts) | | X = 2 |
|---|---|---|---|---|---|---|---|
| 0 | 6592 | 3 | 17552 | 8 | 3 | 6576 | (X + 1) |
| 1 | 19760 | 9 | 4384 | 2 | 3 | 6576 | |
| 2 | 21952 | 10 | 2192 | 1 | 3 | 6576 | |
| 3 | 24144 | 11 | 0 | 0 | 3 | 6576 | |
| 4 | 26336 | 12 | −2192 | −1 | 3 | 6576 | |
| 5 | 6592 | 3 | 15360 | 7 | 4 | 8768 | (X + 2) |
| 6 | 19760 | 9 | 2192 | 1 | 4 | 8768 | |
| 7 | 21952 | 10 | 0 | 0 | 4 | 8768 | |
| 8 | 24144 | 11 | −2192 | −1 | 4 | 8768 | |
| 9 | 13168 | 6 | 8784 | 3 | 4 | 8768 | |

Although the following Tables 3 and 4 show that a value of X signaled from a higher end is 0 or 2 (X=2), the present invention is not limited to the above value of X.

According to the above Tables, a case that implementation is impossible may occur in some examples. For example, if X=2 is signaled through the higher end, since a GP of 0 or less is determined in case of subframe configurations #3, #4, #7, and #8, implementation is impossible in these configurations. As another example, although not suggested through Table, if X=4 is given, implementation is impossible in case of subframe configurations #2, #3, #4, #6, #7, and #8.

In this way, if a special subframe configuration of the TDD system is determined, an sTTI structure pattern of a special subframe may be determined through sTTI of 2- or 3-symbol size in accordance with the special subframe configuration.

FIGS. 9(a) to 9(j) are diagrams illustrating a method for configuring a special subframe of a type 2 radio frame using an sTTI of a 2-symbol structure in accordance with some embodiments of the present invention.

Hereinafter, the sTTI structure pattern configuring one special subframe for the case that subframe configuration is determined as one of 0 to 9 and X is signaled as 0, 2, or 4 from the higher end will be described with reference to FIGS. 9(a) to 9(j).

Also, in each drawing, areas marked with X are used to denote DwPTS areas, areas having no any marks are used to denote GP areas, and vertical oblique area are used to denote UpPTS areas. A pattern disclosed in the lowest end of each drawing shows the sTTI structure pattern configuring the special subframe under a corresponding special subframe configuration. At this time, the diagonal oblique areas and areas marked with dots are shown to identify different sTTIs.

A reference for determining the sTTI structure pattern may be intended such that the sTTI transport block mapped into the boundary of the DwPTS and the GP does not exist. That is, a reference for determining sTTI may be configured such that the number of symbols configuring the DwPTS becomes equal to a total number of symbols configuring a plurality of sTTI transport blocks configuring the DwPTS.

As described above, the number of symbols allocated to the GP and the UpPTS may be varied depending on the value of X received from the higher end. However, the special subframe may be transmitted and received through the sTTI structure pattern determined in accordance with the special subframe configuration regardless of the value of X which is received.

According to the aforementioned reference for determining the sTTI structure pattern, the sTTI structure pattern may be configured such that the sTTI transport block mapped into the boundary of the DwPTS and the GP does not exist. Since the lengths of the GP and the UpPTS are only varied depending on signaling of the value of X of the higher end, the value of X which is signaled does not affect determination of the sTTI structure pattern.

Figure 9A:
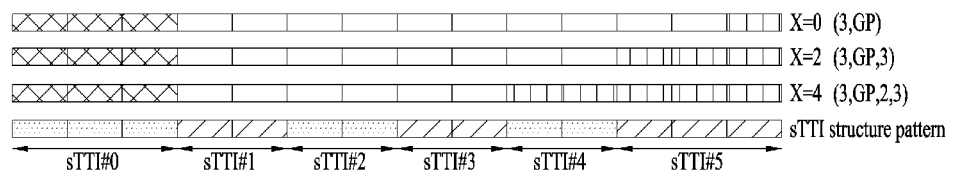
FIGS. 9(a) to 9(j) are diagrams illustrating a method for configuring a special subframe of a frame structure type 2 using an sTTI of a 2-symbol structure in accordance with some embodiments of the present invention.

FIG. 9(a) illustrates an sTTI structure pattern that may be used if a special subframe configuration is given to 0, and Table 5 illustrates an sTTI structure pattern corresponding to FIG. 9(a). At this time, sTTI structure pattern (3, 2, 2, 2, 2, 3) may be configured for the special subframe configuration 0.

TABLE 5

X = 0: DwPTS(3), GP(2, 2, 2, 2, 3)
X = 2: DwPTS(3), GP(2, 2, 2, 2), UpPTS(3)
X = 4: DwPTS(3), GP(2, 2, 2), UpPTS(2, 3)

Figure 9B:
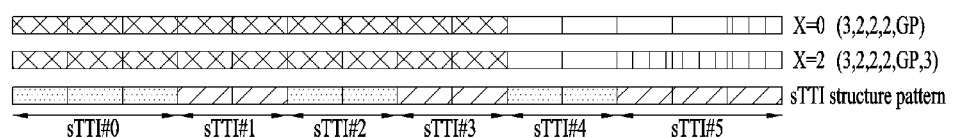

FIG. 9(b) illustrates an sTTI structure pattern that may be used if a special subframe configuration is given to 1, and Table 6 illustrates an sTTI structure pattern corresponding to FIG. 9(b). At this time, sTTI structure pattern (3, 2, 2, 2, 2, 3) may be configured for the special subframe configuration 1.

TABLE 6

X = 0: DwPTS(3, 2, 2, 2), GP(2, 3)
X = 2: DwPTS(3, 2, 2, 2), GP(2), UpPTS(3)

Figure 9C:
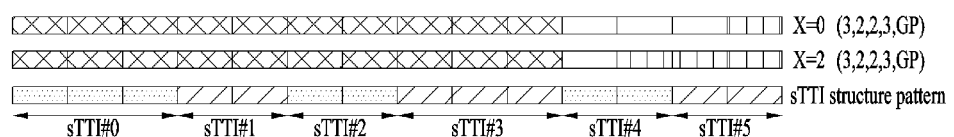

FIG. 9(c) illustrates an sTTI structure pattern that may be used if a special subframe configuration is given to 2, and Table 7 illustrates an sTTI structure pattern corresponding to FIG. 9(c). At this time, sTTI structure pattern (3, 2, 2, 3, 2, 2) may be configured for the special subframe configuration 2.

TABLE 7

X = 0: DwPTS(3, 2, 2, 3), GP(2, 2)
X = 2: DwPTS(3, 2, 2, 3), GP(2, 2)

Figure 9D:
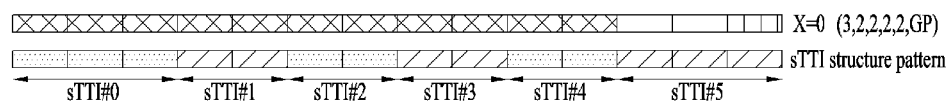

FIG. 9(d) illustrates an sTTI structure pattern that may be used if a special subframe configuration is given to 3, and Table 8 illustrates an sTTI structure pattern corresponding to FIG. 9(d). At this time, sTTI structure pattern (3, 2, 2, 2, 2, 3) may be configured for the special subframe configuration 3.

TABLE 8

X = 0: DwPTS(3, 2, 2, 2, 2), GP(3)

Figure 9E:
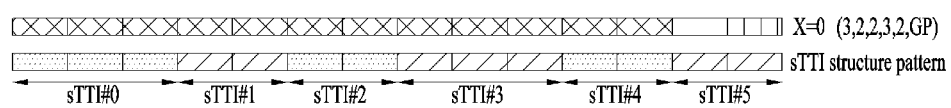

FIG. 9(e) illustrates an sTTI structure pattern that may be used if a special subframe configuration is given to 4, and Table 9 illustrates an sTTI structure pattern corresponding to FIG. 9(e). At this time, sTTI structure pattern (3, 2, 2, 3, 2, 2) may be configured for the special subframe configuration 4.

TABLE 9

X = 0: DwPTS(3, 2, 2, 3, 2), GP(2)

Figure 9F:
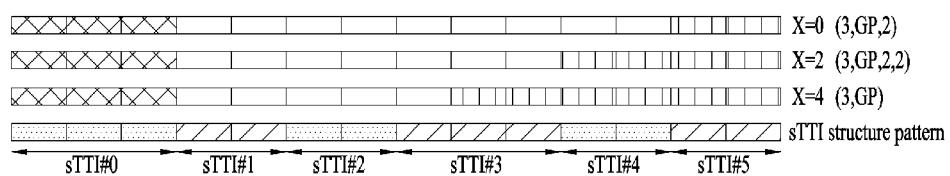

FIG. 9(f) illustrates an sTTI structure pattern that may be used if a special subframe configuration is given to 5, and Table 10 illustrates an sTTI structure pattern corresponding to FIG. 9(f). At this time, sTTI structure pattern (3, 2, 2, 3, 2, 2) may be configured for the special subframe configuration 5.

TABLE 10

X = 0: DwPTS(3), GP(2, 2, 3, 2), UpPTS(2)
X = 2: DwPTS(3), GP(2, 2, 3), UpPTS(2, 2)
X = 4: DwPTS(3), GP(2, 2, 3, 2, 2)

Figure 9G:
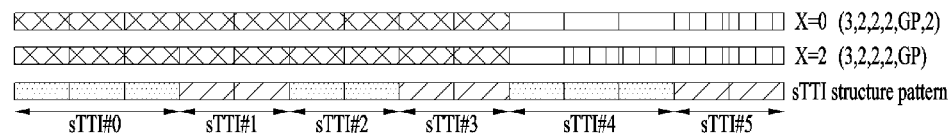

FIG. 9(g) illustrates an sTTI structure pattern that may be used if a special subframe configuration is given to 6, and Table 11 illustrates an sTTI structure pattern corresponding to FIG. 9(g). At this time, sTTI structure pattern (3, 2, 2, 2, 3, 2) may be configured for the special subframe configuration 6.

TABLE 11

X = 0: DwPTS(3, 2, 2, 2), GP(3), UpPTS(2)
X = 2: DwPTS(3, 2, 2, 2), GP(3, 2)

Figure 9H:
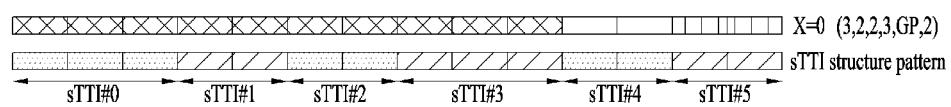

FIG. 9(h) illustrates an sTTI structure pattern that may be used if a special subframe configuration is given to 7, and Table 12 illustrates an sTTI structure pattern corresponding to FIG. 9(h). At this time, sTTI structure pattern (3, 2, 2, 3, 2, 2) may be configured for the special subframe configuration 7.

TABLE 12

X = 0: DwPTS(3, 2, 2, 3), GP(2), UpPTS(2)

Figure 9I:
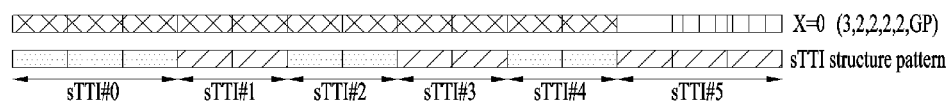

FIG. 9(i) illustrates an sTTI structure pattern that may be used if a special subframe configuration is given to 8, and Table 13 illustrates an sTTI structure pattern corresponding to FIG. 9(i). At this time, sTTI structure pattern (3, 2, 2, 2, 2, 3) may be configured for the special subframe configuration 8.

TABLE 13

X = 0: DwPTS(3, 2, 2, 2, 2), GP(3)

Figure 9J:
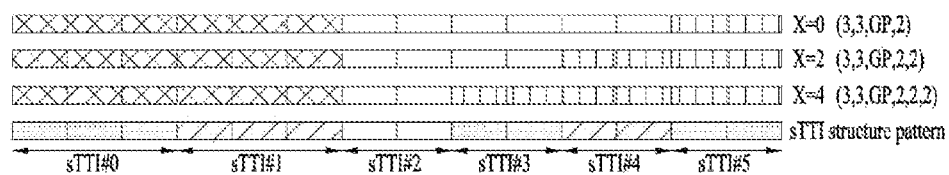

FIG. 9(j) illustrates an sTTI structure pattern that may be used if a special subframe configuration is given to 9, and Table 14 illustrates an sTTI structure pattern corresponding to FIG. 9(j). At this time, sTTI structure pattern (3, 3, 2, 2, 2, 3) may be configured for the special subframe configuration 8.

TABLE 14

X = 0: DwPTS(3, 3), GP(2, 2, 2), UpPTS(2)
X = 2: DwPTS(3, 3), GP(2, 2), UpPTS(2, 2)
X = 4: DwPTS(3, 3), GP(2), UpPTS(2, 2, 2)

The sTTI structure according to the special subframe configuration that may be configured when the number of symbols used for PDCCH is 1 or 3 (CFI=1 or 3) has been described as above. In the same manner, the sTTI structure of the pattern 2 described in FIG. 8 according to the special subframe configurations of 1 to 4 or 6 to 8 may be used when the number of symbols used for PDCCH is 2. When the special subframe configuration is 9, (2, 2, 2, x, x, x, x) may be used.

Table 15 illustrates a relation between the subframe configuration of the special subframe of the aforementioned type 2 radio frame and the sTTI structure pattern.

TABLE 15

| Special Subframe Configuration | PCFICH 1 or 3 (CFI = 1 or 3) | PCFICH 2 (CFI = 2) |
|---|---|---|
| 0 | pattern 1 (3, 2, 2, 2, 2, 3) | |
| 1 | pattern 1 (3, 2, 2, 2, 2, 3) | pattern2 (2, 3, 2, 2, 2, 3) |
| 2 | pattern a (3, 2, 2, 3, 2, 2) | pattern b (2, 3, 2, 3, 2, 2) |
| 3 | pattern 1 (3, 2, 2, 2, 2, 3) | pattern2 (2, 3, 2, 2, 2, 3) |
| 4 | pattern a (3, 2, 2, 3, 2 2) | pattern b (2, 3, 2, 3, 2, 2) |
| 5 | pattern a (3, 2, 2, 3, 2 2) | |
| 6 | pattern c (3, 2, 2, 2, 3, 2) | pattern d (2, 3, 2, 2, 3, 2) |
| 7 | pattern a (3, 2, 2, 3, 2 2) | pattern b (2, 3, 2, 3, 2, 2) |
| 8 | pattern 1 (3, 2, 2, 2, 2, 3) | pattern 2 (2, 3, 2, 2, 2, 3) |
| 9 | pattern e (3, 3, 2, 2, 2, 2) | pattern f (2, 2, 2, 2, 2, 2, 2) |

That is, in order to configure sTTI of the special subframe of the type 2 radio frame structure, the UE may use sTTI structure patterns of the patterns a to f shown in the above Table 15 as sTTI structure patterns for the special subframe in addition to the sTTI patterns 1 and 2 disclosed in FIG. 8, which are used in the related art.

According to another embodiment of the present invention, in order to reduce the number of various sTTI patterns, which may be configured, in accordance with the special subframe configuration, the base station and the UE may limit types of sTTI patterns, which may be configured, to a certain number or less.

For example, when the number of symbols used for transmission of PDCCH is 1 or 3 (CFI=1 or 3), the sTTI structure pattern, which may be configured for transmission of the special subframe, may be limited to pattern '1' and pattern 'a' in the above Table 15. That is, if the special subframe configuration is determined as configuration #6 or #9 through the higher end, the UE may not allow the sTTI structure pattern to be applied to transmission of the special subframe. Alternatively, the UE may determine that a control error occurs if configuration #6 or #9 is signaled as the special subframe configuration, or may discard transmission of the special subframe.

Similarly, when the number of symbols used for transmission of PDCCH is 2 (CFI=2), the sTTI structure pattern, which may be configured for transmission of the special subframe, may be limited to pattern '2' and pattern 'b' in the above Table 15. If the special subframe configuration is determined as configuration #0, #5, #6 or #9 through the higher end, the UE may not allow the sTTI structure pattern to be applied to transmission of the special subframe.

If the special subframe configuration used for transmission of the special subframe is limited as above, since the base station may transmit the special subframe through the limited type of sTTI structure pattern, system overhead may be reduced.

FIG. 10 illustrates a Base Station (BS) and a User Equipment (UE) applicable to an embodiment of the present disclosure.

Referring to FIG. 10, a wireless communication system includes a BS 110 and a UE 120. The BS 110 includes a processor 112, a memory 114 and an RF (radio frequency) unit 116. The processor 112 can be configured to implement the procedures and/or methods proposed in the present disclosure. The memory 114 is connected to the processor 112 and stores various kinds of information related to operations of the processor 112. The RF unit 116 is connected to the processor 112 and transmits and/or receives radio or wireless signals. The UE 120 includes a processor 122, a memory 124 and an RF unit 126. The processor 122 can be configured to implement the procedures and/or methods proposed in the present disclosure. The memory 124 is connected to the processor 122 and stores various kinds of information related to operations of the processor 122. The RF unit 126 is connected to the processor 122 and transmits and/or receives radio or wireless signals. The BS 110 and/or the UE 120 can have a single antenna or multiple antennas.

The above-described embodiments may correspond to combinations of elements and features of the present disclosure in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present disclosure by combining elements and/or features together in part. A sequence of operations explained for each embodiment of the present disclosure may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a BS can be performed by an upper node of the BS in some cases. In particular, in a network constructed with a plurality of network nodes including a BS, it is apparent that various operations performed for communication with a UE can be performed by a BS or other network nodes except the BS. In this case, the term "base station" can be replaced with terms such as "fixed station", "Node B", "eNodeB (eNB)", "access point", etc.

The embodiments of the present disclosure may be implemented using various means. For instance, the embodiments of the present disclosure may be implemented using hardware, firmware, software and/or any combinations thereof. In case of the implementation by hardware, one embodiment of the present disclosure may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present disclosure may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method of transmitting and receiving a signal in a wireless communication system and apparatus therefor can be applied to various wireless communication systems.

The invention claimed is:

1. A method for transmitting/receiving a special subframe from/in a user equipment (UE) in a wireless communication system supporting time division duplex (TDD), the method comprising the steps of:
    receiving information on a special subframe configuration;
    receiving a downlink signal from a base station during a time corresponding to a downlink pilot time slot (DwPTS) allocated in accordance with the special subframe configuration; and
    transmitting an uplink signal to the base station during a time corresponding to an uplink pilot time slot (UpPTS) allocated in accordance with the special subframe configuration,
    wherein the special subframe includes the DwPTS, a guard period (GP), and the UpPTS,
    wherein whether the special subframe is received or transmitted through a sTTI (short transmission time interval) structure pattern including a plurality of sTTI transport blocks is determined based on the information,
    wherein the sTTI structure pattern is determined as one of (3,2,2,3,2,2) and (3,2,2,2,2,3) based on a number of orthogonal frequency division multiplexing (OFDM) symbols used for a transmission of a PDCCH (Physical Downlink Control Channel) being equal to 1 or 3,
    wherein, based on the information configuring 9 OFDM symbols for the DwPTS and 2 OFDM symbols for the UpPTS, or 6 OFDM symbols for the DwPTS and 2 OFDM symbols for the UpPTS, the uplink signal is transmitted without applying the sTTI structure pattern.

2. The method of claim 1, wherein, based on the information configuring 3, 10, 11 or 12 OFDM symbols for the DwPTS, the uplink signal is transmitted by applying the sTTI structure pattern.

3. The method of claim 1, wherein the sTTI structure pattern does not include sTTI transport block mapped into a boundary of the DwPTS and the GP.

4. A method for transmitting/receiving a special subframe from/in a base station in a wireless communication system supporting time division duplex (TDD), the method comprising the steps of:
    transmitting information on a special subframe configuration;
    transmitting a downlink signal to a user equipment (UE) during a time corresponding to a downlink pilot time slot (DwPTS) allocated in accordance with the special subframe configuration; and
    receiving an uplink signal from the UE during a time corresponding to an uplink pilot time slot (UpPTS) allocated in accordance with the special subframe configuration,
    wherein the special subframe includes the DwPTS, a guard period (GP), and the UpPTS,
    wherein whether the special subframe is received or transmitted through a sTTI (short transmission time interval) structure pattern including a plurality of sTTI transport blocks is determined based on the information,
    wherein the sTTI structure pattern is determined as one of (3,2,2,3,2,2) and (3,2,2,2,2,3) based on a number of orthogonal frequency division multiplexing (OFDM) symbols used for a transmission of a PDCCH (Physical Downlink Control Channel) being equal to 1 or 3,
    wherein, based on the information configuring 9 OFDM symbols for the DwPTS and 2 OFDM symbols for the UpPTS, or 6 OFDM symbols for the DwPTS and 2 OFDM symbols for the UpPTS, the uplink signal is transmitted without applying the sTTI structure pattern.

5. The method of claim 4, wherein, based on the information configuring 3, 10, 11 or 12 OFDM symbols for the DwPTS, the downlink signal is transmitted by applying the sTTI structure pattern.

6. The method of claim 4, wherein the sTTI structure pattern does not include sTTI transport block mapped into a boundary of the DwPTS and the GP.

7. A UE for transmitting/receiving a special subframe in a wireless communication system supporting time division duplex (TDD), the UE comprising:
    a radio frequency (RF) unit; and
    a processor,
    wherein the processor is configured to receive information on a special subframe configuration, receive a downlink signal from a base station during a time corresponding to a downlink pilot time slot (DwPTS) allocated in accordance with the special subframe configuration, and transmit an uplink signal to the base station during a time corresponding to an uplink pilot time slot (UpPTS) allocated in accordance with the special subframe configuration,
    wherein the special subframe includes the DwPTS, a guard period (GP), and the UpPTS,
    wherein whether the special subframe is received or transmitted through a sTTI (short transmission time interval) structure pattern including a plurality of sTTI transport blocks is determined based on the information,
    wherein the sTTI structure pattern is determined as one of (3,2,2,3,2,2) and (3,2,2,2,2,3) based on a number of orthogonal frequency division multiplexing (OFDM) symbols used for a transmission of a PDCCH (Physical Downlink Control Channel) being equal to 1 or 3,
    wherein, based on the information configuring 9 OFDM symbols for the DwPTS and 2 OFDM symbols for the UpPTS, or 6 OFDM symbols for the DwPTS and 2 OFDM symbols for the UpPTS, the uplink signal is transmitted without applying the sTTI structure pattern.

8. A base station for transmitting/receiving a special subframe in a wireless communication system supporting time division duplex (TDD), the base station comprising:
    a radio frequency (RF) unit; and
    a processor,
    wherein the processor is configured to transmit information on a special subframe configuration, transmit a downlink signal to a user equipment (UE) during a time corresponding to a downlink pilot time slot (DwPTS) allocated in accordance with the special subframe configuration, and receive an uplink signal from the UE during a time corresponding to an uplink pilot time slot (UpPTS) allocated in accordance with the special subframe configuration,
    wherein the special subframe includes the DwPTS, a guard period (GP), and the UpPTS,
    wherein whether the special subframe is received or transmitted through a sTTI (short transmission time interval) structure pattern including a plurality of sTTI transport blocks is determined based on the information, wherein the sTTI structure pattern is determined as one of (3,2,2,3,2,2) and (3,2,2,2,2,3) based on a number of orthogonal frequency division multiplexing (OFDM) symbols used for a transmission of a PDCCH (Physical Downlink Control Channel) being equal to 1 or 3, wherein, based on the information configuring 9 OFDM symbols for the DwPTS and 2 OFDM symbols for the UpPTS, or 6 OFDM symbols for the DwPTS and 2 OFDM symbols for the UpPTS, the uplink signal is transmitted without applying the sTTI structure pattern.

* * * * *